Nov. 28, 1967  R. HEELEY  3,355,338
METHODS AND MACHINES FOR MOUNTING FASTENER
INSERTS IN AN ELASTOMER
Filed May 5, 1964  6 Sheets-Sheet 1

*Inventor*
*Roland Heeley*
*By his Attorney*
*Carl E. Johnson.*

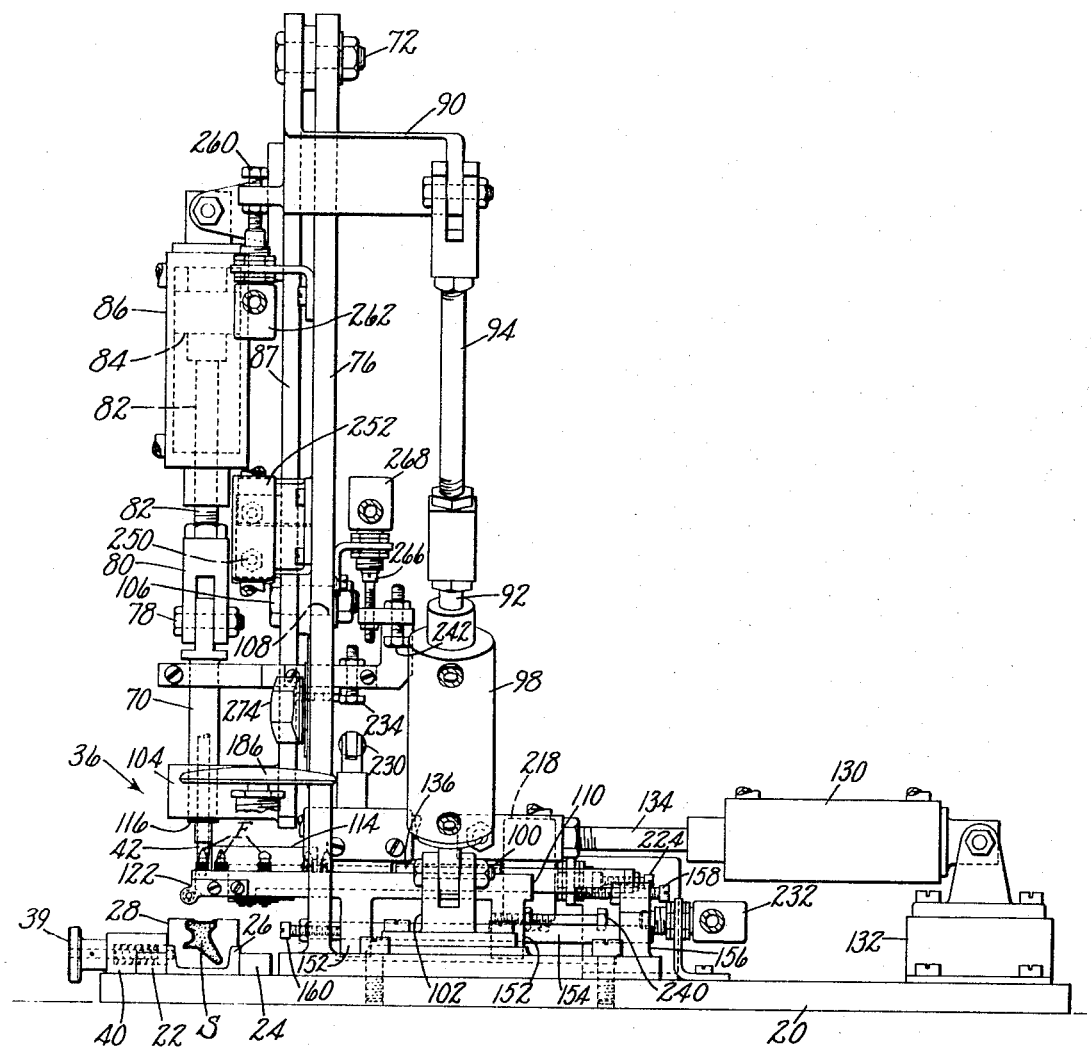

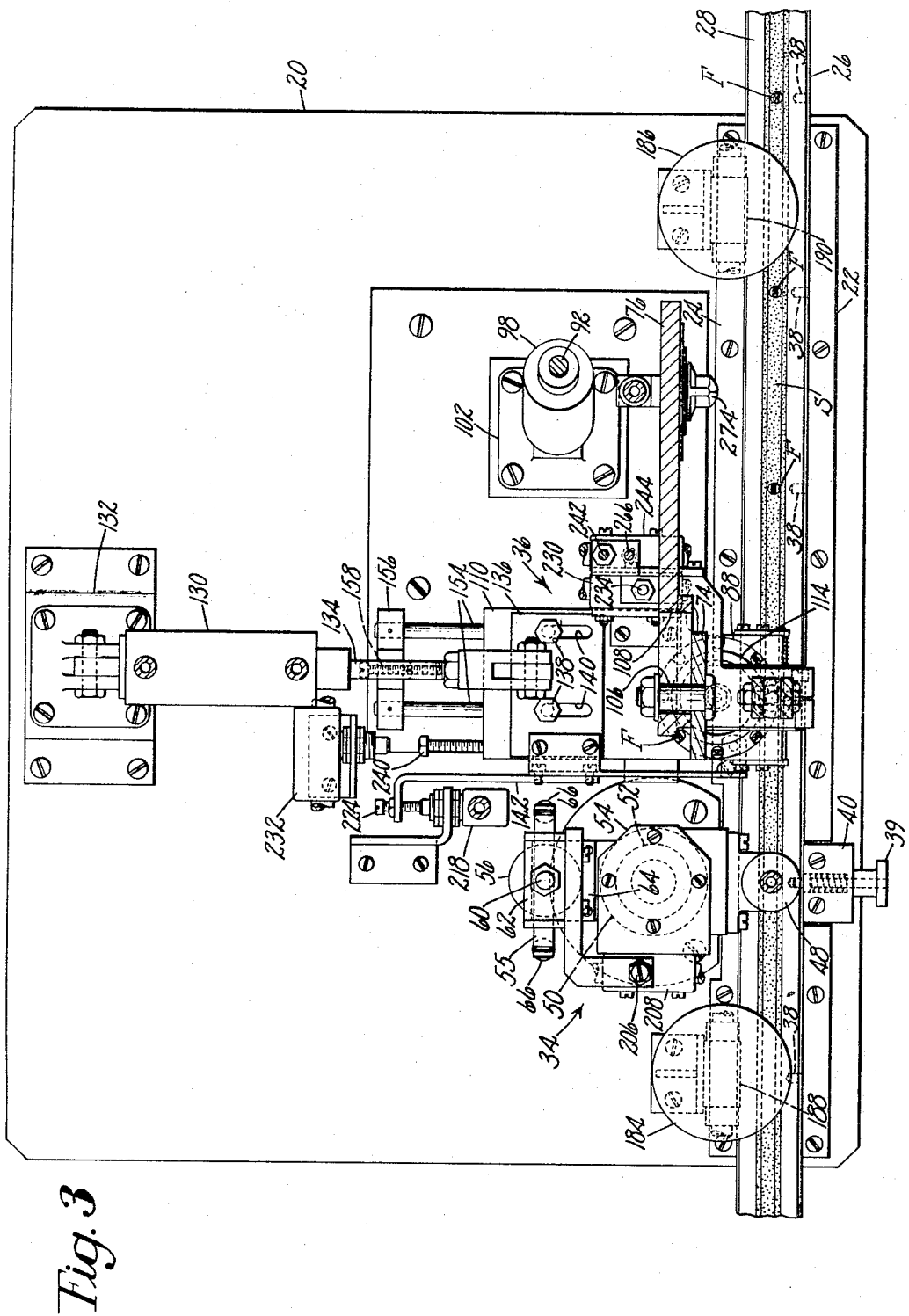

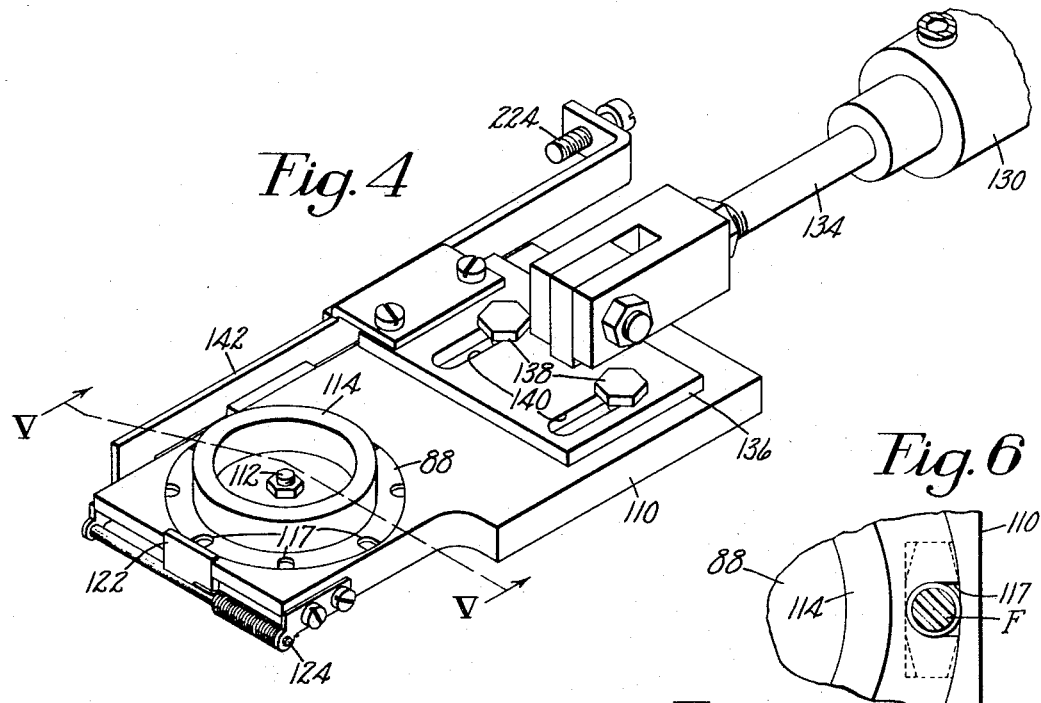

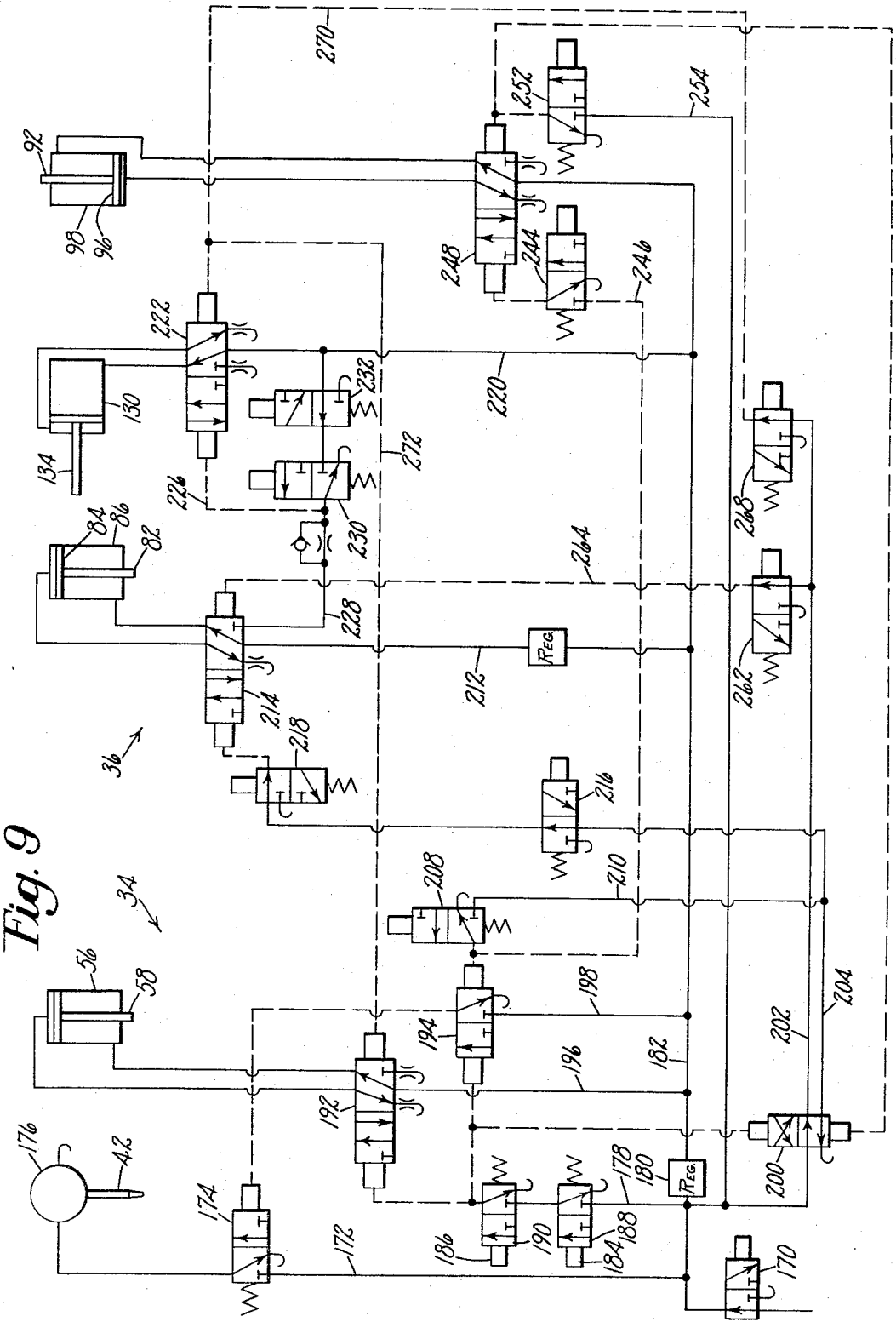

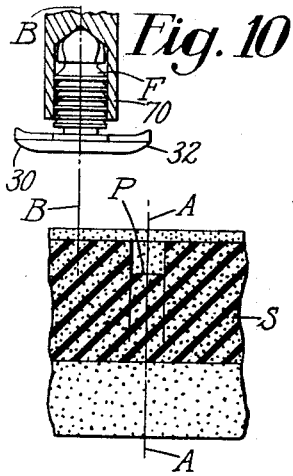
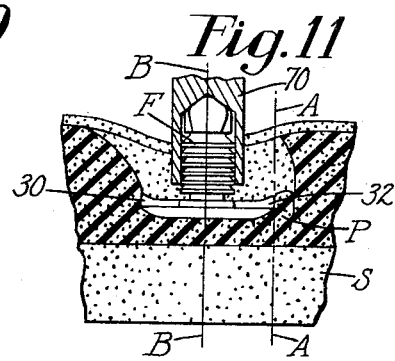
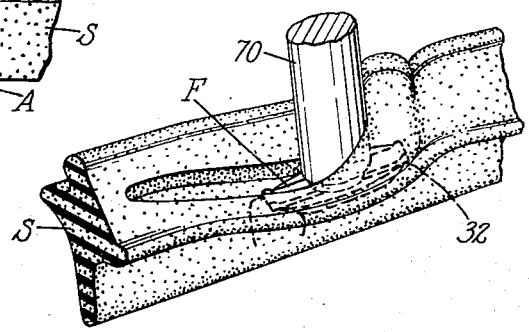
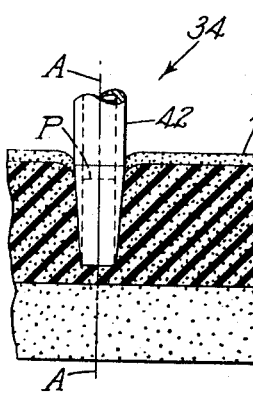
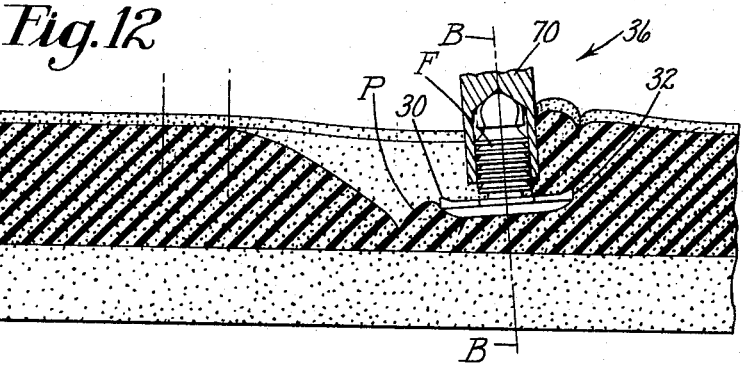
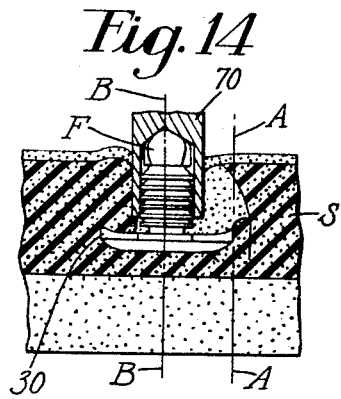
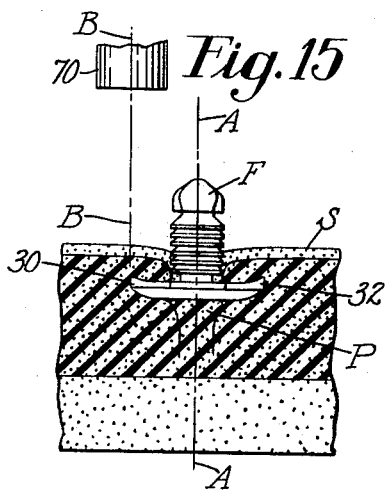
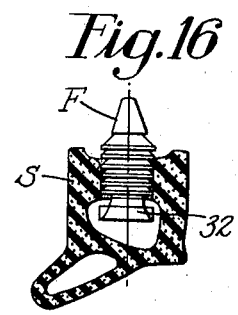

United States Patent Office 3,355,338
Patented Nov. 28, 1967

3,355,338
METHODS AND MACHINES FOR MOUNTING
FASTENER INSERTS IN AN ELASTOMER
Roland Heeley, Beverly, Mass., assignor to United Shoe
Machinery Corporation, Boston, Mass., a corporation
of New Jersey
Filed May 5, 1964, Ser. No. 365,043
15 Claims. (Cl. 156—92)

ABSTRACT OF THE DISCLOSURE

A method and machine for mounting inserts or fasteners in elastic material, for instance plastic clips in rubber weather stripping. A swingable inserter thrusts a clip into a hole formed in a strip by a tool such as a drill. While the drill holds the work piece against movement as a whole, the inserter moves laterally, first in one direction and then in another, to cause the clip to stretch walls of the hole and thereby seat a head or radially projecting hooks of the clip therein.

This invention relates to a method and machine for mounting inserts such as fasteners in elastic material. More particularly, and as herein illustrated, the invention concerns a method and power means for securing or embedding the preformed projections or heads of fasteners, for instance T-shaped anchoring elements, in weather stripping. While the invention is accordingly described herein as applied to the mounting of headed plastic fasteners of a configuration adapted to secure a rubber or rubber-like strip to a frame, for example an automobile door frame, it will be appreciated that in several aspects application of the invention is not thus limited but may be employed in various embodiments without departing from the scope of the invention.

Preliminary to mounting a length of elastomeric material, commonly a sponge rubber or tubular rubber strip, about the frame of a vehicle door, for instance, it is usual to provide the strip with spaced anchoring inserts. Plastic molded inserts for this purpose are especially useful in view of their low cost, resistance to corrosion, and suitable tensile strength. A screw-in type of plastic fastener has often been employed, but its holding power and reliability are no greater than that of a T-shaped insert, and the latter appears to have the advantages of lower cost and easier mounting.

It is therefore an object of this invention to provide a novel method for securing headed inserts, especially T-shaped fasteners, in elastomeric material. Also, it is a primary object of this invention to provide a machine for practicing this method whereby flanged elements, for example T-shaped fasteners, may be inserted expeditiously, securely and accurately in stretchable rubber material such as weather stripping.

To the ends just stated, and in accordance with one method aspect of the invention, a hole of less depth than the height of a T-shaped fastener is first formed in a workpiece of elastomeric material, the cross section of the hole when not deformed substantially corresponding to that of the central stem of the fastener; a part of the cross piece or base of the fastener is then moved against the work piece to compress a first portion thereof axially in the vicinity of the hole and position one of the two projecting base ends of the fastener within the hole; the fastener is next relatively moved transversely of the hole to cause the one base end to radially displace a second portion of the side wall of the hole, the extent of this transverse relative movement being sufficient to move the other end of the base into the hole and thus release the first portion of the work piece from axial compression; the fastener is then relatively returned transversely of the hole causing said first portion of the work piece also to be radially displaced, whereupon the fastener is released permitting the hole and fastener to shift transversely with its base ends anchored securely.

The invention in one of its machine aspects comprises an inserter swingable transversely of a receiving hole in an elastomeric work piece, the hole in its non-dilated condition having a cross section substantially corresponding to that of a stem of a headed or T-shaped insert to be secured therein but smaller widthwise than its projecting base, means mounting the inserter for movement toward and from the vicinity of the hole axially to compress a wall thereof while positioning a first end of the insert base therein, and control means operable, between the inserting and retracting movement of the inserter, to swing the inserter transversely of the hole, first to shift the other end of the insert base into the hole and release its wall from the axial compression, and then return transversely of the hole sufficiently to leave both ends of the base anchored therein.

More particularly, and in accordance with a further feature of the invention in its machine aspect, there is provided in combination, guide means for supporting an elastomeric work piece in which T-shaped inserts are to be mounted, a first station including a tool movable toward and from the work piece to form a hole therein having a cross section substantially that of the stem of an insert, a second station laterally spaced from the first station and including an inserter axially movable toward and from the vicinity of a hole in the work piece formed by the tool, means for feeding each insert to be mounted to the inserter when the latter is retracted from the work piece, and control means thereafter operative sequentially to cause the inserter to thrust part of the anchoring base of the insert into the hole, then move relatively transversely of the hole to stretch its wall in one direction and position the remainder of the insert base in the hole and transversely return to stretch its wall in the opposite direction before releasing the insert stem therein. Preferably, and as herein shown, the operating sequence of the stations is such that the tool, customarily a high-speed, rotary tubular drill, engages the work piece to hold it against lateral displacement as a whole during the transverse installing movements of the inserter. A so-called "dead man safety switch" arrangement is desirably provided to enable an operator to effect simultaneous actuation of the stations.

The above and other features of the invention, together with novel details and arrangements of parts, will now be more particularly described in connection with an illustrative embodiment and with reference to the accompanying drawings thereof, in which:

FIG. 2 is a view in side elevation of the machine shown in FIG. 1;

FIG. 3 is a section taken on the line III—III of FIG. 1;

FIG. 4 is a perspective view of an illustrative fastener feeding means and its actuating mechanism in forward position;

FIG. 5 is a section taken on the line V—V of FIG. 4;

FIG. 6 is a plan view of a detail, looking in the direction of the arrows VI—VI in FIG. 5;

FIG. 7 is a perspective view of the underside of the front end of mechanism shown in FIG. 4;

FIG. 8 is a section taken on the line VIII—VIII of FIG. 7;

FIG. 9 is a diagram of the pneumatic control circuit, the system being shown in starting condition;

FIGS. 10 to 12 and 14 and 15 illustrate sequentially the method followed in mounting the fastener in a sponge rubber work piece, successive operating positions of an inserter being shown relative to a mounting hole;

FIG. 13 is a perspective view of the fastener, its distorted hole and the inserter in a position corresponding to that shown in FIG. 12; and FIG. 16 is a transverse section of a tubular type of weather stripping having a fastener also mounted according to the novel method herein disclosed.

Figure 1:
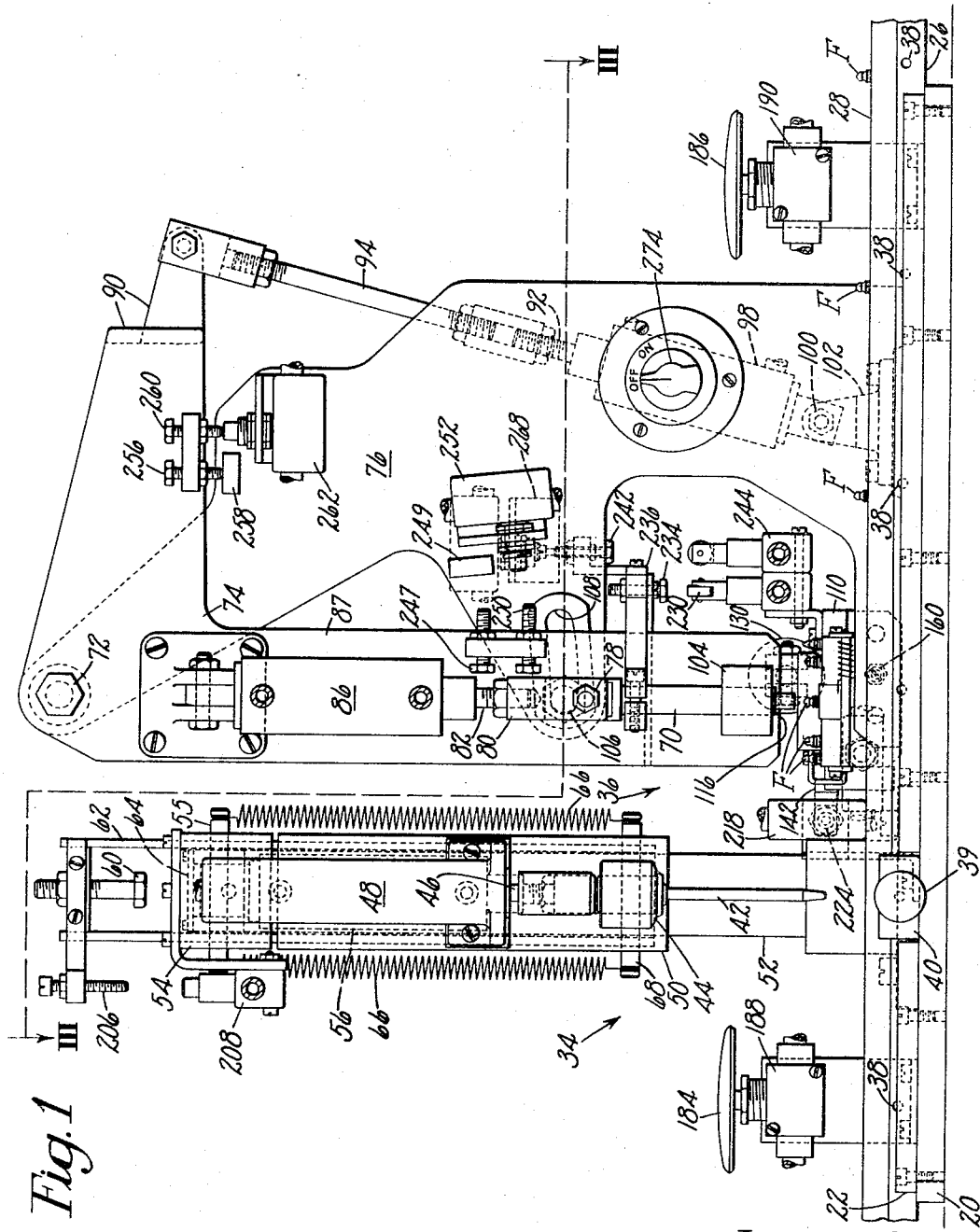
FIG. 1 is a view in front elevation of a machine for mounting headed fasteners especially those having T-shaped heads, in an elastomer such as rubber weather stripping.

For mechanically performing the fastener installation method illustrated herein, the illustrative machine of FIGS. 1–9 now to be described may be used. This machine is shown as adapted to mount flanged or headed fasteners F of generally T-shape in rubber weather stripping S which may, for instance, be of the foam type, or of a tubular rubber construction shown in FIG. 16, for instance. It will be understood that the machine is disclosed herein merely by way of exemplification and that it may be adapted in various ways for different applications without departing from the scope of this invention. A base 20 of the machine is provided on its front portion with a pair of fixed parallel guides 22, 24 (FIGS. 1–3) adapted to receive a channel type, longitudinally slidable work support 26. This preferably consists in its work engaging portion of a moldable material 28 (such as the plastic commercially known and available as Devcon) which is rigid and is formed snugly to fit the rubber strip S supported therein. For purposes of illustration the fasteners F to be installed at spaced intervals along the strip S respectively have a splined central stem and an anchoring cross bar or head formed with radially projecting hook portions 30, 32 (FIG. 10). In order selectively to position the support 26 (and hence the work piece therein) longitudinally with respect to a hole-forming station generally designated 34 (FIGS. 1 and 3) and an inserting station generally designated 36 (FIGS. 1–3), and thus to determine the distance between the axes of the stems of successively mounted fasteners F, the front side of the support 26 is formed with bores 38 respectively arranged to receive an inner end of a spring-pressed detent 39 mounted in a block 40 secured on the base 20.

In order to prepare a sponge or tubular type strip for the reception of the fastener F, the hole is formed, at station 34, having a cross section substantially corresponding to that of the fastener stem. Thus a tubular, high-speed, rotary cutting drill 42 (FIGS. 1, 2 and 3 and 12), preferably having turbine type drive, is carried for vertical reciprocation in a conventional chuck 44 (FIG. 1). The latter is supported on the lower end of a rotary shaft 46 having bearings in a housing 48 (FIGS. 1 and 3) for rotary driving means (not shown). The housing 48 is secured to a vertically slidable sleeve 50 (FIG. 3) mounted on a stationary tubular column 52 upstanding from and secured to the base 20. Means (not shown) is provided to prevent turning of the sleeve and the drill about the vertical axis of the column. Welded to a cap 54 (FIGS. 1, 3) secured on the upper end of the column is a pair of ears carrying a pin 55 for supporting the upper end of a drill actuating cylinder 56 (FIGS. 1, 3, 9). The latter has a piston and a piston rod 58 the lower end of which is operatively connected to the sleeve 50. It will accordingly be understood that, upon admission of fluid under pressure to the upper end of the cylinder 56 by a control system later described, the rod 58 descends to lower the drill into the prepositioned weather stripping. The depth of the hole drilled is adjustably determined by a screw 60 (FIGS. 1 and 3) threaded through a bracket 62 fixed on the sleeve 50 and arranged to abut endwise a plate 64 projecting horizontally from the cap on the cylinder 56. Upon exhausting one end of the latter by means later described, the drill, which also functions as a detent to hold the strip against lengthwise movement as a whole while it is being locally deformed or stretched, is raised from the work piece by introducing fluid pressure in the other end of the cylinder 56 and by the action of a pair of return springs 66, 66 (FIGS. 1 and 3). The latter also hold the drill in raised, inoperative position when the pneumatic system is not pressurized. For this purpose the ends of the springs 66 are connected between the ends of the pin 55 and the ends of a pin 68 extending transversely of the lower end of the piston rod 58. A stop (not shown) limits upward movement of the drill to its starting position shown in FIGS. 1 and 9.

In the case of foam type, non-tubular weather strippings, each hole drilled therein is normally of a depth less than the length of the stem of the fastener F. The walls of the hole may actually extend axially thereof more than the length of the stem, and this is not usually critical, a central plug P (FIGS. 10 and 12) of the strip material usually becoming compacted and remaining largely to occupy the hole. In the case of the tubular stripping (FIG. 16), the hole will, of course, extend to its longitudinally hollow interior portion to afford proper access and anchorage for the fastener portions 30, 32. After the forming of the hole (which may alternatively be done by any preferred means) and retraction of the drill 42, the detent 39 is withdrawn from one registering hole 38 in the support 26, the latter is moved with the stripping in the guideway formed by the guides 22, 24 laterally to shift an axis A—A of the just formed hole (to the right as seen in FIGS. 1 and 10) a distance slightly greater than the distance between the axis of the drill 42 and a vertical axis B—B of a reciprocably mounted inserter 70 (FIGS. 1–3 and 10–15) of the station 36 next to be explained. The detent 39 is then reseated in a bore 38 preparatory to simultaneous operation of both stations 34 and 36 cyclically.

The inserter 70 has a hollow lower end adapted to receive and releasably hold the stems of the successive fasteners F to be mounted. In addition to being vertically reciprocable endwise on its axis B—B, the inserter is relatively movable transversely of the fastener receiving hole locally to stretch and otherwise deform the elastomeric work piece, and in this case is shown as mounted for oscillation in a plane extending substantially coincident with a plurality of the axes of the successively drilled work piece holes. This arrangement is preferred in the illustrative embodiment for the reason that it is desired that the flattened upper ends of the inserted stems, like their diametrical base ends 30, 32, shall lie in uniformly parallel relation to the weather stripping itself. It will be understood, however, that where such arrangement is not a desideratum and there is no necessary orientation of the fasteners, the inserter 70 need only be relatively transversely movable with respect to the individual hole receiving a fastener. As illustrated herein, the inserter is mounted for swinging movement about a pin 72 (FIGS. 1 and 2) extending transversely of the guides 22, 24 and pivotally supporting a roughly L-shaped carrier 74 on the upper end of a frame 76 the base of which is secured by bolts to the frame 20. To this end the inserter has its upper end pivotally connected by a pin 78 to the forked end of a link 80 adjustably threaded onto a piston rod 82 (FIGS. 1, 2 and 9). The latter is actuated by its double acting piston 84 (FIGS. 2 and 9) in a cylinder 86 the upper end of which is bracketed to a vertical arm 87 of the carrier 74. It will accordingly be understood that the fluid pressure control system later to be explained will thus cause the inserter to receive successive fasteners from a suitable fastener feed means, for instance from a rotary turret 88 (FIGS. 3–5) of the type herein shown, and then thrust the fastener, head foremost, toward the vicinity of the receiving hole and subsequently retract therefrom. After the vertical inserting stroke of the inserter along the axis B—B (FIGS. 10, 11) and prior to its retraction along this same axis, the inserter 70 is relatively moved transversely of the hole first in one direction radially thereof and then reversely to effect the sequence of steps illustrated in FIGS. 10–15. For this purpose an arm 90 of the carrier 74 is cyclically pivoted on the pin 72 by means of a piston rod 92 (FIGS. 1 and 2), its adjustable extension 94, a double acting piston 96 (FIG. 9), and its cylinder 98. The lower end of the latter is pivotally secured on a pin 100 mounted in ears of a block 102 fast on the base 20.

The lower portion of the inserter 70 is guided in its heightwise movement by a bearing bracket 104 integral with the lower end of the carrier arm 87, the bracket 104 also serving to steady the inserter when, in the course of a cycle, it locally deforms the walls of the hole in the stripping S as will be later described, the carrier 74 itself is guided during oscillations by a bolt 106 (FIGS. 1–3) slidably extending through an arcuate slot 108 formed in the frame 76, one end of the slot determining the vertical axis B—B and its other end determining the other limit of oscillatory movement of the inserter.

Depending on the character of the work to be done, i.e., the particular type and quantity of the fasteners used and the nature and shape of the elastomer to receive it, various fastener feeding mechanisms may be employed or each fastener may simply be manually thrust into the lower end of the inserter when retracted. The turret 88 and its associated actuating means next to be described have been found satisfactory when a few fasteners are to be successively mounted in each lot. The turret is rotatably nested in the front end of a horizontal slide 110 (FIGS. 2–5 and 7), and secured on the upper end of a pivot pin 112 journaled in the slide. The slide is moved cyclically forward by mechanism later explained to position the front fastener next to be mounted, of a plurality previously loaded in the turret, in alinement with the axis B—B, and the slide is thereafter rearwardly retracted from beneath the inserter 70. The turret comprises an upstanding annular flange 114 arranged to be engaged by a shoulder 116 (FIG. 2) on the inserter when the latter descends to receive the fastener about to be mounted. Circumferentially disposed in the turret are equi-spaced pockets 117 (FIGS. 4–6) formed respectively to receive the base or a head portion of each fastener. A ball detent 118 (FIG. 5) is recessed in the slide 110 for cooperation with successive ones of a circular series of equi-spaced notches 120 formed in the turret thus to retain the turret in each of its indexed positions. The front fastener, as shown in FIG. 8, is stopped adjacent to a spring-pressed gate 122 carried on a pin 124 mounted at the end of the slide 110. Upon retraction of the slide, the inserter shoulder 116 rides off the flange 114 and the retracting gate 122 opens to its phantom position shown in FIG. 8 to permit descent of the inserter as shown in FIGS. 10 and 11.

Means for operating the slide 110 is also effective to index the turret. Thus a cylinder 130 (FIGS. 2–4 and 9) secured by a block 132 to the base 20 has a double acting piston rod 134 pivotally connected at its outer end to a lug integral with a plate 136. The plate 136 is connected to the slide 110 by parallel pin and slot connections 138, 140 to enable a bar 142 (FIGS. 3–5) secured to the plate to operate, during lost motion, between the plate and the slide, an indexing pawl 144 (FIG. 7) and cooperating ratchet wheel 146 at the completion of the forward stroke of the slide. The wheel 146 is formed integrally with the pin 112, and the pawl is pivotally carried by a lever 148 pivotally connecting the bar 142 and the pin 112. For urging the pawl into engagement with the ratchet a tension spring 150 connects a projection of the pawl to the slide 110. In order to guide the slide 110 in its reciprocation, its depending portions 152, 152 (FIGS. 2 and 7) slidably receive, respectively, a pair of parallel rods 154, 154 secured in a block 156 and in the frame 76. Accordingly, it will be understood that admission of fluid pressure to one side of the piston in the cylinder 130 will retract the slide and the turret rearwardly, when the pins 138 have been engaged by the front ends of their slots 140, until a stop screw 158 (FIG. 3) adjustably threaded in the block 156 abuts the back end of the slide; upon pressure being introduced into the other end of the cylinder 130, the plate 136 and the bar 142 are first advanced relatively to the slide 110 and then advance with the slide until the slide abuts a stop screw 160 (FIGS. 1 and 2) threaded through the frame 76, whereupon the plate 136 and the bar 142 advance together to index the next fastener to be mounted into position adjacent to the gate 122 in readiness to be received by the inserter on the axis B—B.

For insuring a proper sequence of operations in the stations 34, 36, a pneumatic control system shown schematically in FIG. 9 is provided and is cyclically operative as next described. A normally open valve 170 admits air under pressure from a source (not shown) to a line 172 connected to a later mentioned spring-return, normally-closed valve 174 controlling rotary drive of the drill 42 through a turbine in a housing 176 (FIG. 9). The valve 170 also normally admits air under pressure to a line 178 and, through a pressure regulator 180, to a main line 182. For initiating a cycle of operation of the machine, a pair of so-called palm switches 184, 186 (FIGS. 1 and 3) is arranged for manual actuation, respectively, of a pair of control valves 188, 190 (FIG. 9) connected in the line 178. Accordingly, concurrent depression of the switches 184, 186 shifts the valves 188, 190 from their normally closed positions to cause pressure from the line 178 to operate a pair of valves 192, 194. The valve 192 controls heightwise movement of the drill 42. Hence pressure from the line 178 shifts the valve 192 from its drill-up position shown in FIG. 9 so that pressure fluid from the line 182 may be directed via a line 196 into one end of the cylinder 56, thereby lowering the drill into the work piece S and exhausting the other end of the cylinder 56. Operation of the valve 194 simultaneously admits pressure fluid from the line 182 via a line 198 to shift the valve 174 from its closed to its open position in the line 172 thus starting rotation of the drill as it descends to form the fastener receiving hole.

A further consequence of the actuation of the switches 184, 186 is that a relay valve 200 (FIG. 9) is shifted from its position shown to exhaust a line 202 and pressurize a line 204. At the end of the drilling stroke when the screw 60 has engaged the plate 64, a screw 206 (FIGS. 1–3) also adjustably threaded through the bracket 62 shifts a valve 208 (FIGS. 1 and 9) from its shown position whereby fluid pressure from the line 204 and a connecting line 210 can return the valve 194 to its shown position and thereby shut off all power to the drill. It then serves as a detent to hold the work piece from shifting laterally as a whole in the course of inserting operations at the station 36. A line 212 initially connects the line 182 through a 4-way valve 214 to one end of the cylinder 86 to retain the inserter 70 in its up position at the start of a cycle. Fluid pressure in the line 204 is exerted through a manually operated, normally open valve 216 and a cyclically operated valve 218 (FIGS. 1 and 9) to shift the 4-way valve 214 and thus pressurize the cylinder 86 whereby the inserter 70 is lowered to its fastener pick-off position on the turret flange 114. The latter will normally have been moved to its forward position by the slide 110 since, as shown in FIG. 9, the then pressurized main line 182 is initially connected by a line 220 through a valve 222 to one end of the cylinder 130 for this purpose and its other end is connected to exhaust. To insure that the inserter is not prematurely lowered, the control valve 218 is shifted to its operating position shown in FIG. 9 by means of a screw 224 (FIGS. 1–3) adjustably threaded through the bar 142 carried by the turret carrying slide 110. At this stage of the cycle, then, the inserter shoulder 116 rests on the flange 114 with the front fastener captured on the axis B—B.

To permit the inserter 70 to resume inserting movement with its fastener along the axis B—B, the slide 110 is retracted with the turret 88 by pressurizing of a pilot line 226 (FIG. 9) extending between the valve 222 and a line 228 connecting the valve 214 to the line 220 via a pair of spring-return valves 230 (FIGS. 1 and 9) and 232 (FIGS. 3 and 9). The pilot line 226 is thus pressurized by reason of the valve 230 being shifted from its exhaust position shown in FIG. 9 in consequence of engagement therewith of a screw 234 (FIG. 1). This screw is adjustably threaded through a bracket 236 one end of which is clamped on the inserter 70. The shifted valve 230 is also effective to relieve downward pressure on the inserter 70 thereby facilitating turret retraction.

In the course of retraction of the slide 110, a bolt 240 (FIG. 3) adjustably threaded therein engages and shifts the valve 232 from its shown position. As the result the inserter is caused to complete its down stroke to the position illustrated in FIG. 11, at which time a bolt 242 (FIG. 1) adjustably threaded through an end of the bracket 236 actuates a valve 244 (FIGS. 1 and 9). The latter then pressurizes a pilot line 246 to shift a valve 248, and thereby introduces pressure fluid to one side of the piston 96, causing the inserter 70 to be swung about the pin 72 and hence moved relatively lengthwise of the work piece to move the fastener transversely of its hole to the position indicated in FIGS. 12 and 13. The limit of swinging movement of the inserter in one direction is adjustably determined by a stop screw 247 in the arm 87 abutting a block 249 on the frame 76.

Reviewing the mounting action with reference to FIGS. 10–13, a portion of the head of the fastener F is first caused to compress one wall portion of the formed hole axially, the projecting portion 32 freely descending into the hole and compacting its plug P, if any. It preferably is while the drill 42 is serving as a detent in an adjacent hole, as shown in FIG. 12, that the relative transverse movement is imparted to the fastener, as by the swinging movement of the inserter, to cause the portion 32 radially to displace a side wall portion of the hole, the strip S being stretched as the hole is transversely elongated and the portion 32 becomes embedded in the side wall. (It will be apparent that this phase of the mounting may alternatively be accomplished, if found desirable with other type of work, by a lateral shifting of the work piece S in lieu of transverse movement of the inserter 70.) The extent of relative lateral movement of the inserter (to the right in FIG. 12) is sufficient to move the head portion 30 into the hole and thus release its wall from the initial axial compression imparted by the inserter 70. At the extremity of its relative transverse movement the inserter is reversely swung by reversal of the valve 248. This is effected by a bolt 250 (FIG. 1) adjustably threaded in the arm 87 and actuating a valve 252 (FIGS. 1 and 9) affixed to the frame 76. For this purpose the valve 252 is in a line 254 (FIG. 9) connected to the line 178. Return movement of the inserter from its position shown in FIGS. 12 and 13 to that indicated in FIG. 14 swings its axis B—B back past the initial position of the hole axis A—A to its original position of vertical alinement wherein the head portion 30 has radially deformed and compacted the wall and become embedded therein. At this limit of reversal movement a stop screw 256 (FIG. 1) adjustably threaded through the arm 90 abuts a block 258 formed on the frame 76, and a screw 260 (FIG. 1) also adjustably threaded in the arm 90 actuates a valve 262 (FIGS. 1 and 9). The latter has pilot connection by a line 264 to the valve 214 and is, prior to being shifted by the screw 260, operatively connected to the line 202. Shifting of the valve 262 from its shown position causes the valve 214 to retract the inserter 70 upwardly on its vertical axis B—B to starting position.

As will be apparent from (FIGS. 14 and 15), as soon as the inserter 70 is lifted from the stripping S the fastener F is embraced thereby and left anchored therein by its ends 30, 32, and it is free to adjust laterally to tension remaining in the elastomeric material, normally assuming a position wherein its axis substantially corresponds with the hole axis A—A. The splined fastener stem will also be projected upwardly by the decompressed material of the stripping and is available for securing thereof as may be required. As the inserter 70 approaches its upper or starting position, a screw 266 (FIGS. 2 and 3) adjustably threaded through the bracket 236 actuates a valve 268 (FIGS. 1, 2 and 9) in the line 202 having pilot connection through a line 270 to the valve 222. As a result the valve 222 causes the slide 110 to move forwardly preparatory to indexing the next fastener to be installed, and a pilot line 272 is effective to actuate the cylinder 192 and thereby raise the drill 42 in readiness for forming another hole in the stripping S.

It is believed a cycle of operations of the machine and the novel method of installation will be clear from the above description. When first commencing operations, however, only the drill 42 should be actuated to form the first hole, the station 36 being kept inoperative. To this end an operator will initially shift the valve 216 to its closed position by moving a control knob 274 (FIG. 1) to its "off" position. Then the switches 184, 186 are actuated causing the drill to operate, whereupon the valve 252 is manually actuated to retract the drill. Now the work piece may be suitably shifted and the knob 274 may be moved to "on" position and a normal cycling of both stations 34, and 36 is begun by actuating the switches 184, 186.

Having thus described my invention, what I claim as new and desire to secure by Letters Patent of the United States is:

1. The method of mounting a fastener having a stem and a pair of projections extending radially therefrom in an elastomeric work piece, consisting in forming a receiving hole having a cross section substantially corresponding to that of the stem, next relatively moving the fastener transversely of the hole to cause one of the projections radially to displace and deform a side wall portion of the hole while positioning the other projection within the hole, next relatively returning the fastener transversely of the hole to deform an opposite side wall portion of the hole, and lastly allowing the fastener to assume its final position in the hole as embraced by the work piece.

2. The method of mounting a fastener having a stem and a pair of oppositely extending projections in an elastomeric work piece, which consists in forming a hole in the work piece of less depth than the length of the stem of the fastener from which the projections extend, the hole corresponding in cross section substantially to that of the stem, then relatively moving the fastener and the work piece to compress a side wall of the hole axially and position one of the projections within the hole, next relatively moving the fastener laterally transversely of the hole to cause said projection to compress and displace a second portion of the side wall of the hole and to position the other projection within the hole, and lastly relatively returning the fastener transversely of the hole to cause the other projection to compress another side wall portion as said second wall portion is partly decompressed whereupon the fastener is anchored by its projections.

3. A machine for mounting a fastener in an elastomeric work piece, the fastener having a stem and a pair of anchoring projections extending radially therefrom, comprising means for forming in the work piece a hole defined by side walls and having a cross section corresponding substantially to that of the stem, an inserter adapted releasably to hold the fastener by its stem, means for relatively moving the inserter toward and from a work piece hole formed by said means initially to position one of the projections therein, and means operative between the inserting and retractive strokes of the inserter for relatively moving the inserter together with the stem carried thereby transversely of the hole thus to cause first the one and then the other side of the fastener to displace the wall of the hole to cause said projections to become anchored with respect to the work piece.

4. A machine for mounting, in a hole of an elastomeric work piece, a fastener of the type having a stem and a pair of diametric anchoring projections, comprising a support for the work piece adapted to permit the walls of the hole therein to be transversely distorted while the work piece as a whole is restrained against lateral displacement, an inserter for releasably seizing the fastener stem, means for moving the inserter first toward the support to thrust one of the projections into the hole while the other projection compresses the wall axially and subsequently retractively away from the support, and mechanism automatically operative between the inserting and retractive strokes of the inserter relatively to move it transversely of the hole whereby first the one and then the other of the projections radially displace opposite portions of the wall and are anchored in the work piece with the stem substantially centered in the hole.

5. A machine as set forth in claim 4 wherein means is provided for successively feeding a fastener to be inserted into position to be received by the inserter each time the latter is retracted from the work piece.

6. A machine for mounting, in a hole in an elastomeric strip, a fastener having oppositely extending projections, comprising means for guiding the strip along a path to predeterminedly position the hole, an inserter mounted for movement toward and from the strip along an inserting axis offset from and parallel to an axis of the hole and for relative lateral movement in a plane containing both of these axes, and power means operable cyclically to cause the inserter first to thrust the fastener against the strip to compress a portion of the wall of the hole and position one of the fastener projections therein, then to effect relative lateral movements of the inserter in said plane to cause displacement of the wall of the hole in diametrically opposite directions whereby the projections are anchored in the strip, and lastly to retract the inserter along the inserting axis to permit the anchored fastener to assume a position centered substantially on the axis of the hole.

7. A machine as set forth in claim 6 wherein power means is provided for cyclically forming the holes for receiving the fasteners successively to be inserted, the power means being adapted to cause the hole forming means in each cycle to serve as a detent for holding the strip against movement as a whole relative to the guiding means during the lateral and retractive movements of the inserter.

8. A machine as set forth in claim 6 wherein means is provided for feeding successive fasteners to the inserter, the fastener feeding means being adapted to deliver each fastener with its projections extending in uniformly oriented relation to the path of the strip.

9. A machine for mounting fasteners having a stem and head projections in an elastomeric work piece, comprising means for forming spaced holes in the work piece, the diameter of the holes corresponding to that of the stem, mounting means including a reciprocable inserter pivotally supported adjacent to the hole forming means, and control mechanism for cyclically actuating the hole forming and mounting means, the control mechanism including means automatically operative after each inserting stroke of the inserter to move the latter in opposite directions transversely of a hole made by the forming means to anchor the head projections in the work piece.

10. A machine as set forth in claim 9 further characterized in that the control mechanism includes a fluid pressure operated circuit, said circuit including valving for pivoting the inserter and for causing the hole forming means to act as a work engaging detent during the oscillation of the inserter.

11. A machine for mounting the T-shaped heads of fasteners in elastomeric material comprising a support for the material, a frame secured to the support, a carrier pivotally supported on the frame, an inserter reciprocably mounted on the carrier for movement toward and from the material along an axis offset from that of a fastener receiving hole therein, means for delivering a fastener to be mounted to the inserter when it is retracted from the material, means for reciprocating the inserter along said offset axis, and means automatically operative between the inserting and retracting strokes of the inserter for swinging the carrier in the general plane of the fastener head to cause the inserter and hence the fastener thereon temporarily to deform the walls of the hole in successive opposite directions whereby the head is secured in the material.

12. A machine as set forth in claim 11 wherein a pair of air operated piston-cylinder devices is provided for operating, respectively, the inserter reciprocably and the carrier swingably, and automatic control means is connected to said devices for effecting the operating movements of the inserter and the carrier in sequence.

13. A machine as set forth in claim 11 wherein the fastener delivering means includes an indexable, rotary turret for presenting successive fasteners into the operative path of the inserter.

14. A machine for mounting fasteners having a stem and anchoring projections at one end thereof in an elastomeric strip, comprising a guideway for supporting the strip for movement along a predetermined path, and a hole forming station and a fastener mounting station spaced along the path for installing fasteners successively in the successive holes formed at the hole forming station, the hole forming station including a reciprocable, rotary drill, and the mounting station including a reciprocable inserter mounted for oscillation toward and from the drill between the inserting and retractive strokes of the inserter to cause the respective projections of a fastener carried thereby to stretch the walls of a hole in the strip and be embraced thereby.

15. A machine as set forth in claim 14 wherein automatic control means is provided for cyclically actuating the hole forming and mounting stations, said control means being operable to hold the drill in work engaging relation in the strip during oscillation of the inserter to prevent movement of the strip as a whole in the guideway.

References Cited

UNITED STATES PATENTS

| | | | |
|---|---|---|---|
| 1,576,874 | 3/1926 | Stevens | 264—249 |
| 1,959,318 | 5/1934 | Sundback | 24—205 |
| 2,005,895 | 6/1935 | Hengstenberg | 72—19 |
| 3,117,050 | 1/1964 | Otstot | 156—120 X |

EARL M. BERGERT, *Primary Examiner.*

HAROLD ANSHER, *Assistant Examiner.*